(12) United States Patent
Gilstrom et al.

(10) Patent No.: US 11,511,159 B2
(45) Date of Patent: *Nov. 29, 2022

(54) POWER MANAGEMENT IN EXERCISE MACHINE

(71) Applicant: Tonal Systems, Inc., San Francisco, CA (US)

(72) Inventors: Lars Eugene Gilstrom, Berkeley, CA (US); David Mallard, San Francisco, CA (US); Thomas Kroman Watt, San Francisco, CA (US)

(73) Assignee: Tonal Systems, Inc., San Francisco, CA (US)

(*) Notice: Subject to any disclaimer, the term of this patent is extended or adjusted under 35 U.S.C. 154(b) by 75 days.

This patent is subject to a terminal disclaimer.

(21) Appl. No.: 17/011,319

(22) Filed: Sep. 3, 2020

(65) Prior Publication Data

US 2021/0154531 A1 May 27, 2021

Related U.S. Application Data (63) Continuation of application No. 16/360,723, filed on Mar. 21, 2019, now Pat. No. 10,792,539.

(51) Int. Cl.
*A63B 24/00* (2006.01)
*H02J 9/00* (2006.01)
*A63B 21/005* (2006.01)

(52) U.S. Cl.
CPC ...... *A63B 24/0087* (2013.01); *A63B 21/0058* (2013.01); *H02J 9/002* (2013.01); *A63B 2225/685* (2013.01)

(58) Field of Classification Search
CPC .............. A63B 21/0058–0059; A63B 24/0087
See application file for complete search history.

(56) References Cited

U.S. PATENT DOCUMENTS

| 4,921,244 | A | 5/1990 | Berroth |
| 4,934,694 | A * | 6/1990 | McIntosh ............. A63B 21/154 73/379.06 |
| 8,900,099 | B1 | 12/2014 | Boyette |
| 10,668,316 | B2 * | 6/2020 | Mcbride ............ A63B 21/4001 |
| 2014/0274564 | A1 | 9/2014 | Greenbaum |
| 2016/0121156 | A1 | 5/2016 | Bach |
| 2017/0319905 | A1 * | 11/2017 | O'Connor ........ A63B 21/00181 |
| 2018/0104542 | A1 | 4/2018 | Kwon |
| 2019/0126090 | A1 | 5/2019 | O'Connor |

FOREIGN PATENT DOCUMENTS

KR 101160960 6/2012

* cited by examiner

*Primary Examiner* — Jennifer Robertson
(74) *Attorney, Agent, or Firm* — Van Pelt, Yi & James LLP (57) ABSTRACT

A request is received for a higher torque from a torque controller than is possible from a power supply. The torque controller is coupled to a motor and the power supply, and the motor is coupled to an actuator. The actuator ultimately establishes resistance for a user in an exercise. An energy storage device is discharged to the motor in order to generate the higher torque, wherein the energy storage device is indirectly coupled to the torque controller.

24 Claims, 5 Drawing Sheets

POWER MANAGEMENT IN EXERCISE MACHINE

CROSS REFERENCE TO OTHER APPLICATIONS

This application is a continuation of U.S. patent application Ser. No. 16/360,723 entitled POWER MANAGEMENT IN EXERCISE MACHINE filed Mar. 21, 2019 which is incorporated herein by reference for all purposes.

BACKGROUND OF THE INVENTION

Strength training, also referred to as resistance training or weight lifting, is an important part of any exercise routine. It promotes the building of muscle, the burning of fat, and improvement of a number of metabolic factors including insulin sensitivity and lipid levels. Many users seek a more efficient and safe method of strength training that allows a large range of weights to lift.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using an energy storage device to provide extra power to an exercise machine is disclosed. The energy storage device is regenerated during concentric movements in the exercise machine. The extra power from the energy storage device may be combined with power from a standard electrical power supply, enabling the machine to generate higher resistances than would be available by solely relying on the standard electrical power supply. Alternatively, or in combination, a pulley system is used to increase resistance experienced by the user.

The disclosed techniques may be used with any exercise machine, for example using a digital strength training technique as described in U.S. Provisional Patent Application No. 62/366,573 entitled METHOD AND APPARATUS FOR DIGITAL STRENGTH TRAINING filed Jul. 25, 2016 and U.S. patent application Ser. No. 15/655,682 entitled DIGITAL STRENGTH TRAINING filed Jul. 20, 2017, which are incorporated herein by reference for all purposes. The disclosed techniques may be used without limitation with other exercise machines, and the digital strength trainer is given merely as an example embodiment.

Figure 1:
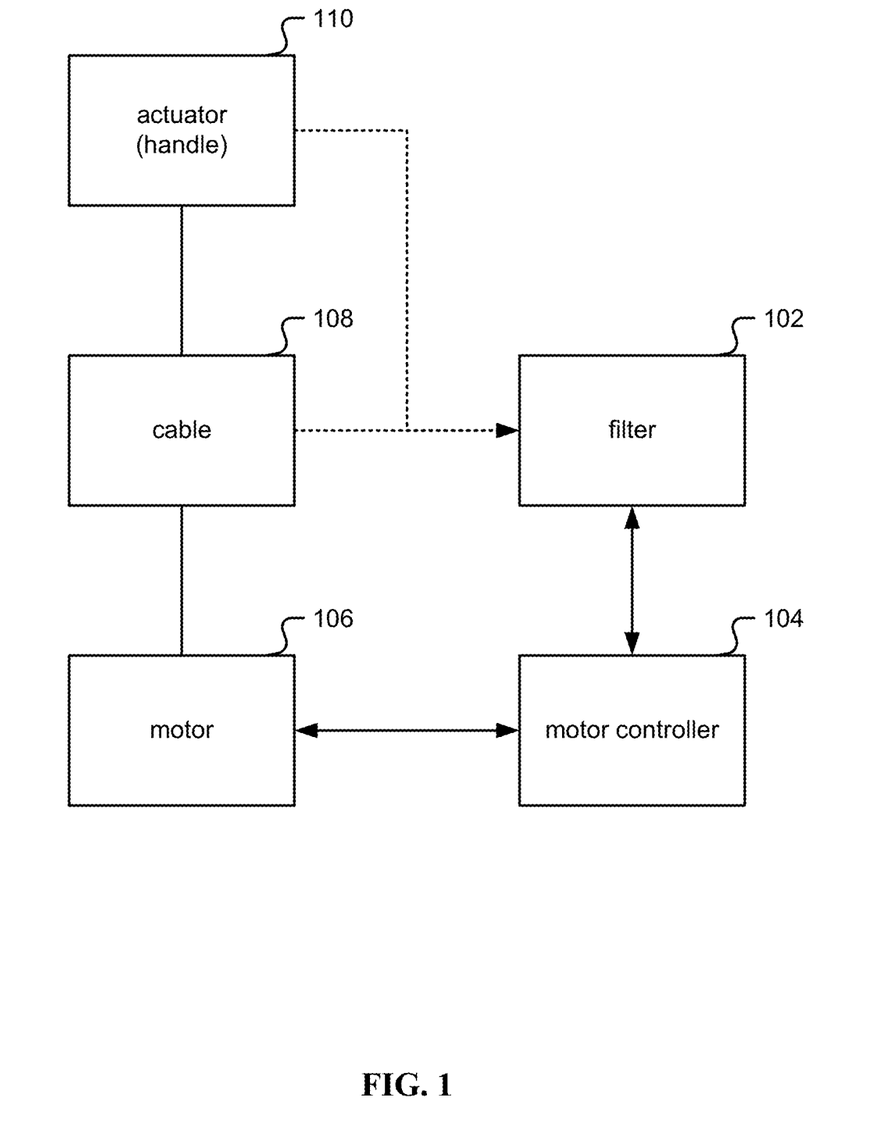
FIG. 1 is a block diagram illustrating an embodiment of an exercise machine capable of digital strength training.

An Example Exercise Machine. FIG. 1 is a block diagram illustrating an embodiment of an exercise machine capable of digital strength training. The exercise machine includes the following:

- a controller circuit (104), which may include a processor, inverter, pulse-width-modulator, and/or a Variable Frequency Drive (VFD);
- a motor (106), for example a three-phase brushless DC driven by the controller circuit;
- a spool with one or more cables (108) wrapped around the spool and coupled to the spool. On the other end of the cable an actuator/handle (110) is coupled in order for a user to grip and pull on. The spool is coupled to the motor (106) either directly or via a shaft/belt/chain/gear mechanism. Throughout this specification, a spool may be also referred to as a "hub";
- a filter (102), to digitally control the controller circuit (104) based on receiving information from the cable (108) and/or actuator (110);
- optionally (not shown in FIG. 1) a gearbox between the motor and spool. Gearboxes multiply torque and/or friction, divide speed, and/or split power to multiple spools. Without changing the fundamentals of digital strength training, a number of combinations of motor and gearbox may be used to achieve the same end result. A cable-pulley system may be used in place of a gearbox, and/or a dual motor may be used in place of a gearbox;
- one or more of the following sensors (not shown in FIG. 1): a position encoder; a sensor to measure position of the actuator (110). Examples of position encoders include a hall effect sensors, magnetic shaft encoders, optical encoders on the motor/spool/cable (108), an accelerometer in the actuator/handle (110), optical sensors, position measurement sensors/methods built directly into the motor (106), and/or optical encoders. In one embodiment, an optical encoder is used with an encoding pattern that uses phase to determine direction associated with the low resolution encoder. Other options that measure back-EMF (back electromagnetic force) from the motor (106) in order to calculate position also exist;

a motor power sensor; a sensor to measure voltage and/or current being consumed by the motor (106);

a user tension sensor; a torque/tension/strain sensor and/or gauge to measure how much tension/force is being applied to the actuator (110) by the user. In one embodiment, a tension sensor is built into the cable (108). Alternatively, a strain gauge is built into the motor mount holding the motor (106). As the user pulls on the actuator (110), this translates into strain on the motor mount which is measured using a strain gauge in a Wheatstone bridge configuration. In another embodiment, the cable (108) is guided through a pulley coupled to a load cell. In another embodiment, a belt coupling the motor (106) and cable spool or gearbox (108) is guided through a pulley coupled to a load cell. In another embodiment, the resistance generated by the motor (106) is characterized based on the voltage, current, or frequency input to the motor.

In one embodiment, a three-phase brushless DC (BLDC) motor (106) is used with the following:

a controller circuit (104) combined with filter (102) comprising:
  a processor that runs software instructions;
  three pulse width modulators (PWMs), each with two channels, or 6 PWMs
  six transistors in an H-Bridge configuration coupled to the 6 PWM channels;
  optionally, two or three ADCs (Analog to Digital Converters) monitoring current on the H-Bridge; and/or
  optionally, two or three ADCs monitoring back-EMF voltage;
a cable (108) wrapped around the body of the motor (106) such that entire motor (106) rotates, so the body of the motor is being used as a cable spool in one case. Thus, the motor (106) is directly coupled to a cable (108) spool. In one embodiment, the motor (106) is coupled to a cable spool via a shaft, gearbox, belt, and/or chain, allowing the diameter of the motor (106) and the diameter of the spool to be independent, as well as introducing a stage to add a set-up or step-down ratio if desired. Alternatively, the motor (106) is coupled to two spools with an apparatus in between to split or share the power between those two spools. Such an apparatus could include a differential gearbox, or a pulley configuration; and/or
an actuator (110) such as a handle, a bar, a strap, or other accessory connected directly, indirectly, or via a connector such as a carabiner to the cable (108).

In one embodiment, the three-phase brushless DC motor (106), may include a synchronous-type and/or asynchronous-type permanent magnet motor, such that:
  a. the motor (106) may be in an "out-runner configuration" as described below;
  b. the motor (106) may have a maximum torque output of at least 60 Nm and a maximum speed of at least 300 RPMs; and/or
  c. optionally, with an encoder or other method to measure motor position.

In some embodiments, the controller circuit (102, 1004) is programmed to drive the motor in a direction such that it draws the cable (108) towards the motor (106). The user pulls on the actuator (110) coupled to cable (108) against the direction of pull of the motor (106).

One purpose of this setup is to provide an experience to a user similar to using a traditional cable-based strength training machine, where the cable is attached to a weight stack being acted on by gravity. Rather than the user resisting the pull of gravity, they are instead resisting the pull of the motor (106).

Note that with a traditional cable-based strength training machine, a weight stack may be moving in two directions: away from the ground or towards the ground. When a user pulls with sufficient tension, the weight stack rises, and as that user reduces tension, gravity overpowers the user and the weight stack returns to the ground.

By contrast in a digital strength trainer, there is no actual weight stack. The notion of the weight stack is one modeled by the system. The physical embodiment is an actuator (110) coupled to a cable (108) coupled to a motor (106). A "weight moving" is instead translated into a motor rotating. As the circumference of the spool is known and how fast it is rotating is known, the linear motion of the cable may be calculated to provide an equivalency to the linear motion of a weight stack. Each rotation of the spool equals a linear motion of one circumference or $2\pi r$ for radius r. Likewise, torque of the motor (106) may be converted into linear force by multiplying it by radius r.

If the virtual/perceived "weight stack" is moving away from the ground, motor (106) rotates in one direction. If the "weight stack" is moving towards the ground, motor (106) rotates in the opposite direction. Note that the motor (106) is pulling towards the cable (108) onto the spool. If the cable (108) is unspooling, it is because a user has overpowered the motor (106). Thus, note a distinction between the direction the motor (106) is pulling, and the direction the motor (106) is actually turning.

If the controller circuit (102, 1004) is set to drive the motor (106) with, for example, a constant torque in the direction that spools the cable, corresponding to the same direction as a weight stack being pulled towards the ground, then this translates to a specific force/tension on the cable (108) and actuator (110). Calling this force "Target Tension", this force may be calculated as a function of torque multiplied by the radius of the spool that the cable (108) is wrapped around, accounting for any additional stages such as gear boxes or belts that may affect the relationship between cable tension and torque. If a user pulls on the actuator (110) with more force than the Target Tension, then that user overcomes the motor (106) and the cable (108) unspools moving towards that user, being the virtual equivalent of the weight stack rising. However, if that user applies less tension than the Target Tension, then the motor (106) overcomes the user and the cable (108) spools onto and moves towards the motor (106), being the virtual equivalent of the weight stack returning.

While many motors exist that run in thousands of revolutions per second, an application such as fitness equipment designed for strength training has different requirements and is by comparison a low speed, high torque type application suitable for a BLDC motor.

In one embodiment, a requirement of such a motor (106) is that a cable (108) wrapped around a spool of a given diameter, directly coupled to a motor (106), behaves like a 200 lbs weight stack, with the user pulling the cable at a maximum linear speed of 62 inches per second. A number of motor parameters may be calculated based on the diameter of the spool.

| User Requirements | | | | | | |
|---|---|---|---|---|---|---|
| Target Weight | 200 lbs | | | | | |
| Target Speed | | 62 inches/sec = | | 1.5748 meters/sec | | |
| Requirements by Spool Size | | | | | | |
| Diameter (inches) | 3 | 5 | 6 | 7 | 8 | 9 |
| RPM | 394.7159 | 236.82954 | 197.35795 | 169.1639572 | 148.0184625 | 131.5719667 |
| Torque (Nm) | 67.79 | 112.9833333 | 135.58 | 158.1766667 | 180.7733333 | 203.37 |
| Circumference (inches) | 9.4245 | 15.7075 | 18.849 | 21.9905 | 25.132 | 28.2735 |

Thus, a motor with 67.79 Nm of force and a top speed of 395 RPM, coupled to a spool with a 3 inch diameter meets these requirements. 395 RPM is slower than most motors available, and 68 Nm is more torque than most motors on the market as well. E-bike motors may be in the 350 to 450 RPM range, but many top out around 50-60 Nm if they are wound for that speed range. The internal motor windings may be used to trade off motor speed vs torque as well as external mechanical advantage.

Hub motors are three-phase permanent magnet BLDC direct drive motors in an "out-runner" configuration: throughout this specification out-runner means that the permanent magnets are placed outside the stator rather than inside, as opposed to many motors which have a permanent magnet rotor placed on the inside of the stator as they are designed more for speed than for torque. Out-runners have the magnets on the outside, allowing for a larger magnet and pole count and are designed for torque over speed. Another way to describe an out-runner configuration is when the shaft is fixed and the body of the motor rotates.

Hub motors also tend to be "pancake style". As described herein, pancake motors are higher in diameter and lower in depth than most motors. Pancake style motors are advantageous for a wall mount, subfloor mount, and/or floor mount application where maintaining a low depth is desirable, such as a piece of fitness equipment to be mounted in a consumer's home or in an exercise facility/area. As described herein, a pancake motor is a motor that has a diameter higher than twice its depth. As described herein, a pancake motor is between 15 and 60 centimeters in diameter, for example 25 centimeters in diameter, with a depth between 6 and 50 centimeters, for example a depth of 6.7 centimeters.

Motors may also be "direct drive", meaning that the motor does not incorporate or require a gear box stage. Depending on the internal number turns and number of windings it is possible to tradeoff torque and speed. Many motors are inherently high speed low torque but incorporate an internal gearbox to gear down the motor to a lower speed with higher torque and may be called gear motors. Direct drive motors may be explicitly called as such to indicate that they are not gear motors.

If a motor does not exactly meet the requirements illustrated in the table above, the ratio between speed and torque may be adjusted by using gears or belts to adjust. A motor coupled to a 9" sprocket, coupled via a belt to a spool coupled to a 4.5" sprocket doubles the speed and halves the torque of the motor. Alternately, a 2:1 gear ratio may be used to accomplish the same thing. Likewise, the diameter of the spool may be adjusted to accomplish the same.

Alternately, a motor with 100× the speed and 100th the torque may also be used with a 100:1 gearbox. As such a gearbox also multiplies the friction and/or motor inertia by 100×, torque control schemes become challenging to design for fitness equipment/strength training applications. Friction may then dominate what a user experiences. In other applications friction may be present, but is low enough that it is compensated for, but when it becomes dominant, it is difficult to control for. For these reasons, direct control of motor speed and/or motor position as with BLDC motors is more appropriate for fitness equipment/strength training systems.

Power Management in an Exercise Machine. In one embodiment, the exercise machine depicted in FIG. 1 is limited to 200 lb on the cable (108). Athletes may be able to exert 200 lb of resistance force on an actuator at a maximum speed of 90 inches per second. One goal is to be able to double this capacity temporarily and support professional athletes who may be able to exert 400 lb of resistance force on the actuator at a maximum speed of 180 inches per second. In one embodiment, there are two cables (108) in the exercise machine, one per arm, with 100 lb resistance on each cable (108), and 200 lb total.

A first reason for this limit may concern physical risks, for example the cable (108) being pulled against an extended arm, causing high torque against the physical connection between the exercise machine and the wall.

A second reason concerns the limits of standard electrical supply. As referred to herein without limitation, a "standard" electrical supply is any electrical supply at a predetermined capacity, for example that of a general-purpose circuit size for a US residence of 110V-125V at 15 A, or a European or Chinese residence of 220V-250V at 10 A. Even if physical risks in the first reason are reduced, electrical limits still exist for exercise machines to be compatible with a larger percentage of residences.

A typical standard circuit in the USA rated for 120V and 15 A may provide 1800 W of input AC power, and after conversion and losses there is approximately 1500 W of power available for driving a motor based exercise system. In other countries the power from a standard residential circuit also has similar limits.

Higher power circuits may be available in any home but are only in a few rooms like laundry rooms, kitchens, garages, or closets. Relying on a higher power circuit would prohibit installation in most rooms or involve costly renovations that would significantly reduce the market for an exercise machine as in FIG. 1. Even with a costly renovation, a larger power supply for the exercise machine to handle higher power circuits are less common and present a greater expense to manufacturing exercise machines.

Thus, a standard circuit provides about 1500 W of power to drive a motor based exercise system which is around 200 lb of total resistance. This may not be enough for many athletes, for example professional athletes may be able to deadlift 400 lb. That is, the average power output capability of professional athletes may be approximately 400 W continuous for 1 hr, however their instantaneous power may be 10 times that amount in the case of weight lifting. It is this instantaneous or inrush power requirement where the need for a power boost comes in.

In the case of digital strength training, beyond resistance there is also a speed of movement component to make the exercise feel natural and effective. In general, mechanical advantage systems like a gearing system or motor design may be used to increase resistance at the expense of speed, but the fact remains that some movements are both heavy and fast.

Increasing both the maximum resistance and speed of the exercise machine without requiring a change in the electrical connection for the machine is disclosed. Instead of using an energy storage device solely for backup purposes or to drive auxiliary devices, for example during a power outage, the energy storage device may be used also for boosting the power of the exercise machine beyond that available from the electrical connection. The energy storage device may be charged through use of the exercise machine.

Figure 2A:
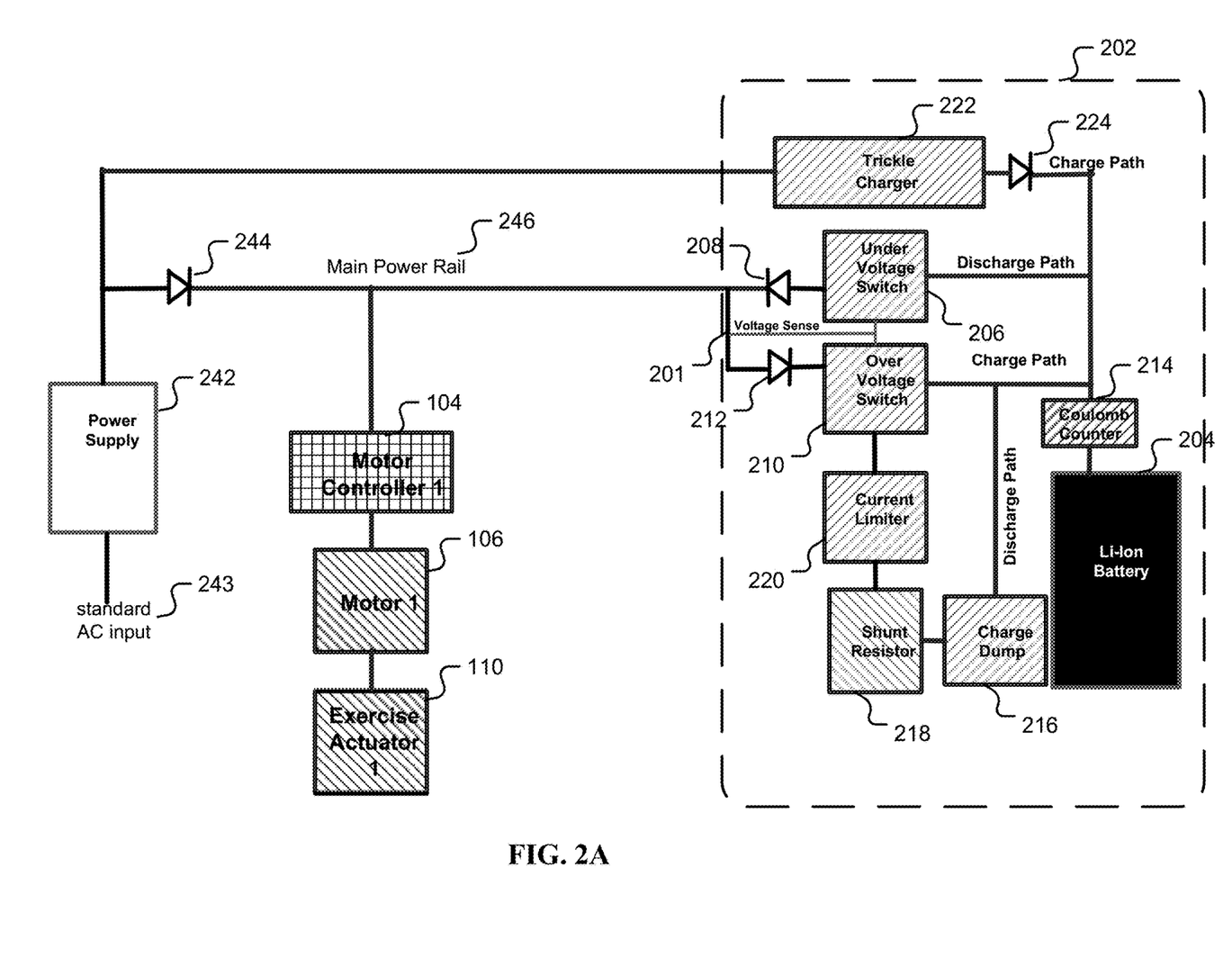
FIG. 2A is a block diagram illustrating an embodiment of a system for power management for an exercise machine.

FIG. 2A is a block diagram illustrating an embodiment of a system for power management for an exercise machine. A motor (106) system is shown in FIG. 2 with associated actuator (110) and motor controller (104).

Motors (106) are limited by the torque and speed that they can generate for a given power input. The tradeoff means that as torque is increased then speed is reduced. To meet the force and speed requirements for exercise equipment where both fast and slow movements and heavy and light forces are needed a motor may be designed appropriately. Typically motors that may meet both these requirements use between 1000-1500 W of power.

When using multiple motors simultaneously it may no longer be possible to simply draw this much power from a standard household AC (alternating current) circuit. Storing energy in an appropriately sized energy storage device (204) to boost the available power to be able to drive multiple high power motors (106) to their full peak force is disclosed. As referred to herein, an "energy storage device" includes any device capable of energy storage including without limitation a sealed lead-acid battery, absorbent glass mat (AGM) battery, gel battery, a deep cycle battery, a marine battery, a lithium-ion battery, a lithium iron phosphate battery, a capacitor, and a supercapacitor. In FIG. 2A, the example of a lithium-ion battery is given.

Motor controllers (104) take power first from the power supply unit (242) which is coupled through a blocking diode (244) to the main power rail (246). The PSU (242) is coupled directly to a standard AC input (243), for example a 120V 15 A household circuit. In the event it is detected via voltage sense (201) that the main power rail (246) droops in voltage because the PSU (242) cannot supply sufficient energy/current then the power management module (202) steps in.

For the purposes of illustration, a main power rail (246) of 48V is used without limitation. For example, a PSU (242) may be a 48V, 32 A constant current PSU. A corresponding Li-Ion battery (204) may be a 48.1V 13S4P 18650 35 A battery with at least 10 Ah. In one embodiment, LiFePO4 and LiFeMnPO4 batteries are used for the lithium chemistry. Other chemistries may not be as stable for high charge/discharge currents, but these other chemistries have higher volume to charge ratios.

Under voltage switch (206), its associated diode (208) enables energy to flow from the energy storage device (204) to boost motors to be driven towards the desired force. For example, a 47.5 Volt under voltage switch (206) may be used for a main power rail (246) of 48V. If the energy storage device (204) is fully charged then the energy storage device (204) is used first to bring the device (204) to a nominal charge level instead of drawing initially from the PSU (242) for appropriate maintenance of the storage technology of energy storage device (204). A trickle charger (222) and associated diode (224) is used to charge the energy storage device (204) in order to conduct appropriate charging and discharging care and maintenance of the Li-Ion battery (204). A one to five Ampere trickle charger (222) may be used when the energy storage device (204) goes below 30% total charge until it reaches 50% total charge. In one embodiment, trickle charging is not from a separate supply but sourced from the main 48V supply, for example the 48V is boosted by the trickle charger to match the required charge voltage.

In the event the user is pulling against the direction of resistance by a motor (106), that is, in the concentric direction, then the motor (106) acts as a generator to recharge the energy storage device (204). The faster/harder the motor (106) is turned by the user via the actuator (110), the more power generated. As the motor (106) generates power the motor controller (104) feeds it back into the main rail (246) causing the voltage to rise.

As the voltage increase in the main rail (246) is detected by voltage sense (201), an over voltage switch (210) and associated diode (212) enables energy/current to flow into the charging path of the energy storage device (204) optionally through a Coulomb counter (214). For example, a 48.5 Volt over voltage switch (210) may be used for a main power rail (246) of 48V. If the current exceeds the charging capability of the energy storage device (204), for example as detected by an optional current limiter (220), or if the energy storage device (204) has reached capacity as detected by the Coulomb counter (214) or other means, then excess energy/current is dumped via optional charge dump (216) into shunt resistor (218). For example, a current limiter may have a voltage rating of 100V.

The shunt resistor (218) may be used to maintain the Li-Ion battery (204) within given charging and discharging characteristics. For example, if the battery (204) goes above 80% total charge, the shunt resistor (218) may be used to discharge the battery (204) to 50% total charge. In one embodiment (not shown), instead or in conjunction with the shunt resistor (218), excess energy is fed back to an AC household system with an AC inverter, or used as a charging outlet for a user to plug in their own devices.

Sizing of the energy storage device (204) may be specific to the use case of an exercise machine. In one embodiment, for a cable based exercise machine it is assumed a duty cycle of approximately 50% rest, 20% concentric, 30% eccentric or holding. For a 1500 W PSU, about the maximum that a standard circuit can supply, an exercise machine power management module (202) is designed to supply 3000 W at peak loads.

Figure 2B:
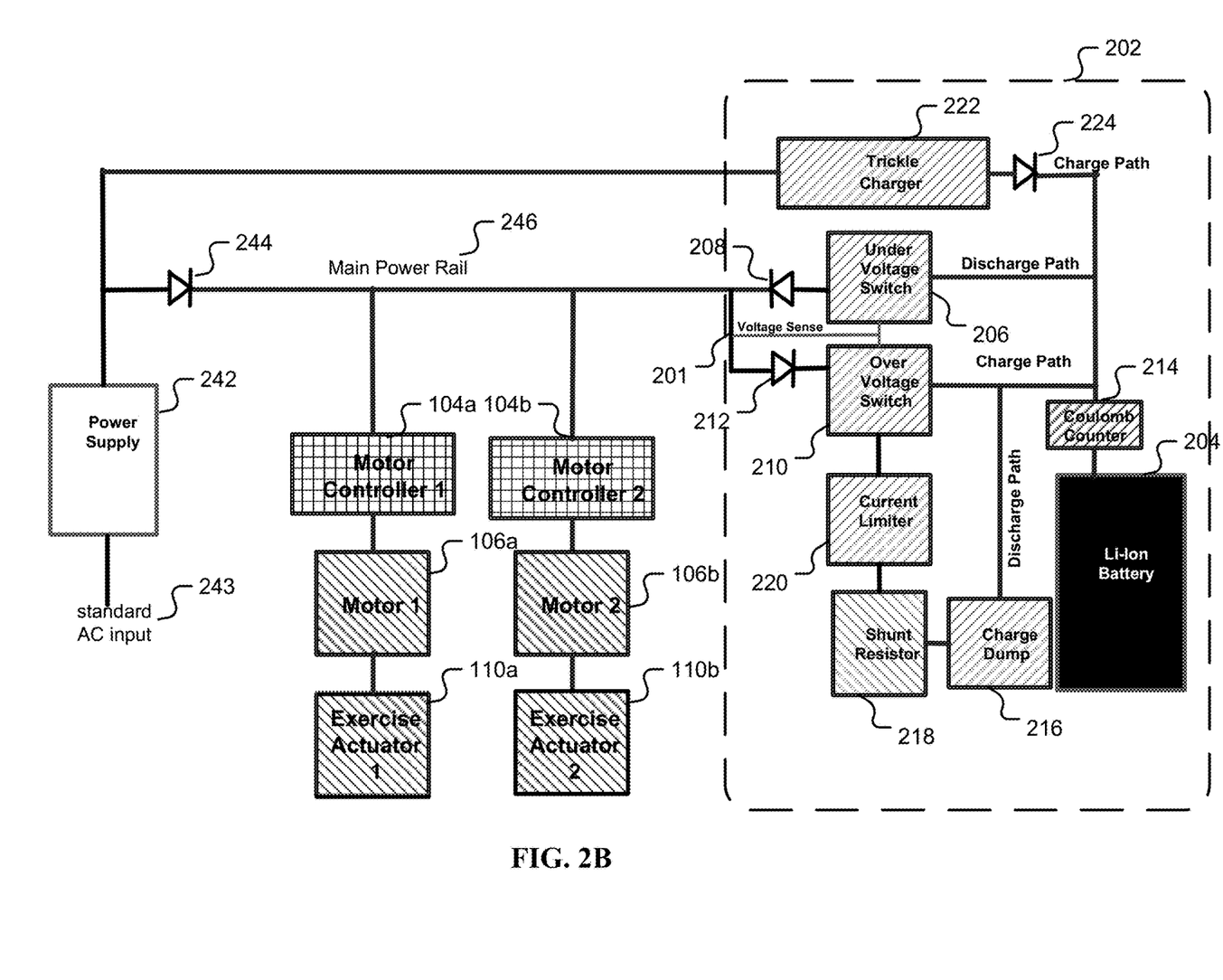
FIG. 2B is a block diagram illustrating an embodiment of a system for power management for an exercise machine with more than one motor.

During a 400 lb concentric pull, each motor of two motors (106a, 106b) may generate up to 60 Amperes. The energy storage device (204) may support an overall peak drain of 3000 W so that the excess 1500 W supplied by the energy storage device (204) corresponds to 1500 W/48 V=32 A discharge current, with as high a peak charge rate for short durations as possible to capture as much of the user generated power quickly. In one embodiment, the energy storage device (204) has a capacity sufficient to boost power for the maximum expected duration and duty cycle of the high power demand, for example a capacity in the range of 100 Wh to 250 Wh.

In one embodiment, pulleys are used to multiply or divide resistance experienced by the user at the cost of the speed of the motor. Instead of attaching the end of the rope directly to a handle, bar, or another attachment, the end of the rope may be fixed to the ground, a platform, the machine itself, or another fixed or moving object. The rope may then flow through one or more pulleys to multiply or divide the force experienced by the user relative to the force being created by the torque of the motor. The pulleys may be attached to the handle, bar, or other attachment and to other fixed or moving parts of the system to create the desired force multiple.

FIG. 2B is a block diagram illustrating an embodiment of a system for power management for an exercise machine with more than one motor. For example, a motor (106a, 106b) system is shown in FIG. 2B with associated actuator (110a, 110b) and motor controller (104a, 104b), one motor system per arm of the user. The same principles described above and/or depicted in FIG. 2A may be adapted to the system in FIG. 2B.

Figure 2C:
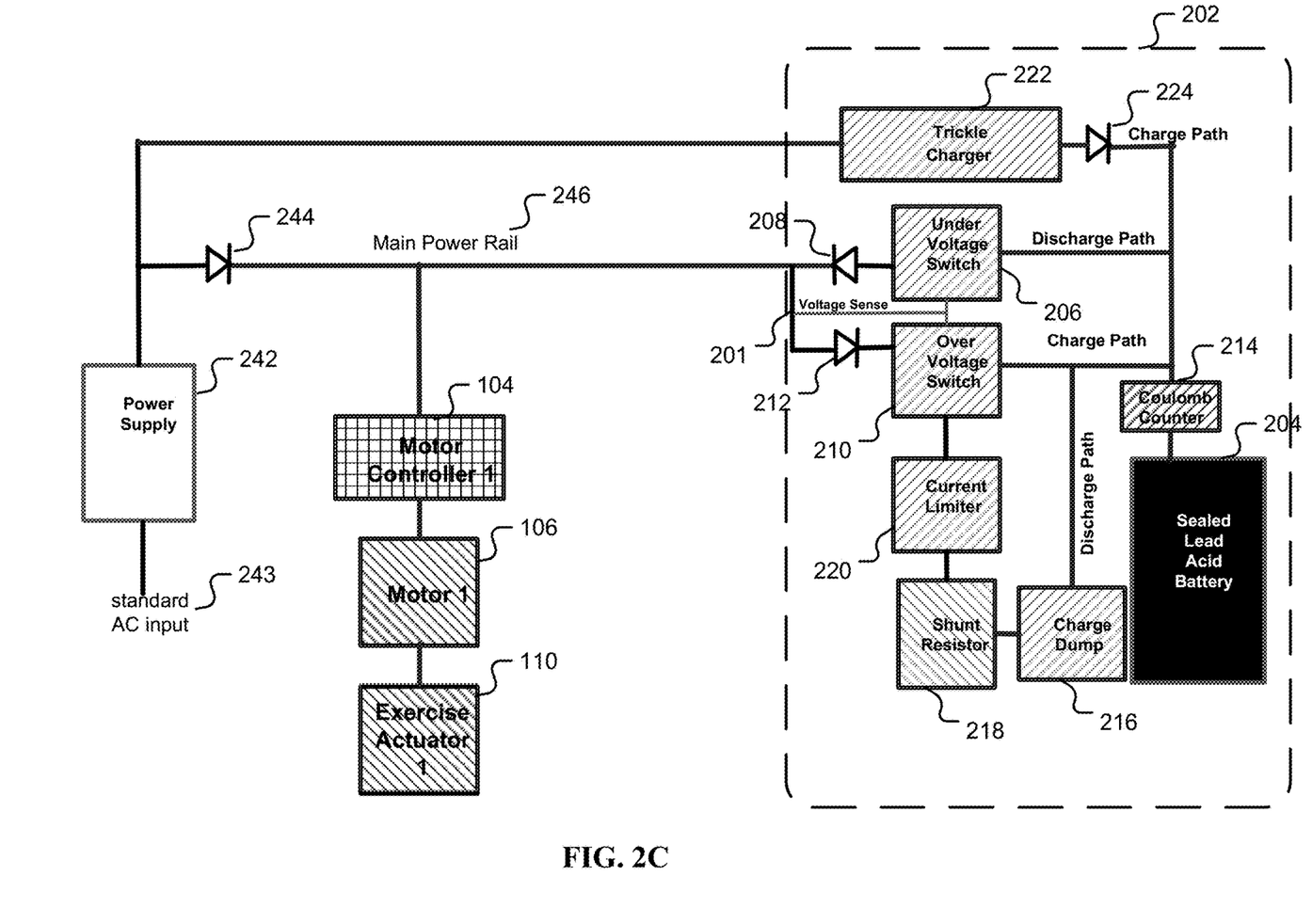
FIG. 2C is a block diagram illustrating an embodiment of a system for power management for an exercise machine with an alternate energy storage device.

FIG. 2C is a block diagram illustrating an embodiment of a system for power management for an exercise machine with an alternate energy storage device. For example, a sealed lead acid battery (204) is used, such as a 48V AGM battery. The same principles described above and/or depicted in FIG. 2A may be adapted to the system in FIG. 2C, wherein the trickle charger (222) and shunt resistor (218) may be altered to adapt to the sealed lead acid battery technology and best practices for charging and discharging characteristics.

Figure 3:
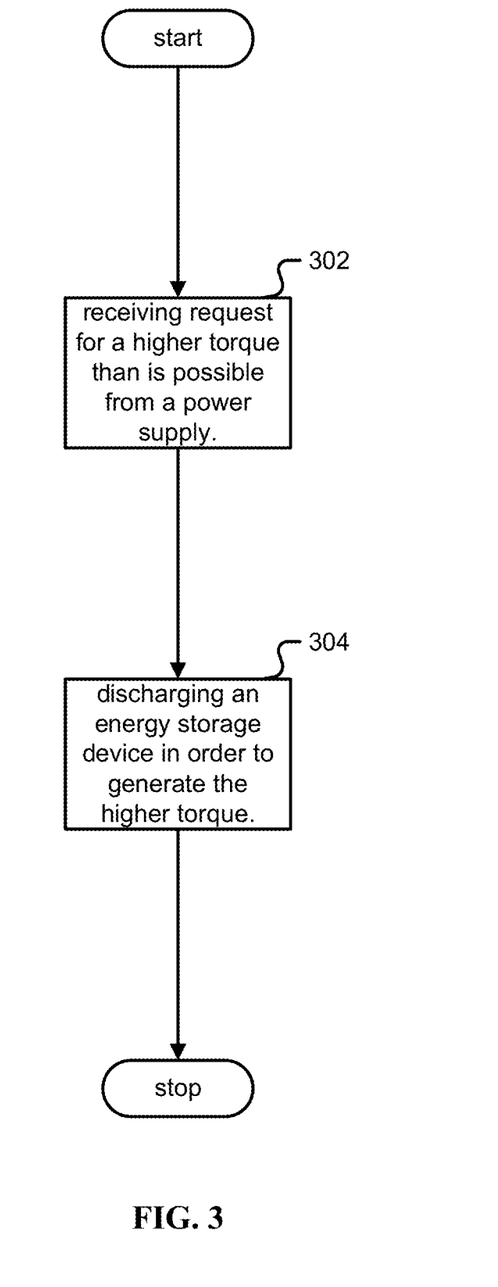
FIG. 3 is a flow chart illustrating an embodiment of a process for power management for an exercise machine.

FIG. 3 is a flow chart illustrating an embodiment of a process for power management for an exercise machine. In one embodiment, the process of FIG. 3 is carried out by the power management module (202) of FIG. 2.

In step 302, a request is received for a higher torque from a torque controller (104) than is possible from a power supply (242), wherein the torque controller (104) is coupled to a motor (106) and the power supply (242), and the motor (106) is coupled to an actuator (110), and the actuator (110) ultimately establishes resistance for a user in an exercise. In one embodiment, the "request" is received by sensing a drooping voltage along a main power rail (246).

In step 304, an energy storage device (204) is discharged to the motor (106) in order to generate the higher torque, wherein the energy storage device (204) is indirectly coupled to the torque controller (104).

The actuator (110) is coupled via a cable to the motor (106). The power supply (242) is coupled to a standard household AC power circuit (243). The standard household AC power circuit (243) comprises any circuit with power less than 2000 Watts.

The energy storage device (204) comprises at least one of the following: a sealed lead-acid battery, a deep cycle battery, a marine battery, a lithium-ion battery, a lithium iron phosphate battery, a capacitor, and a supercapacitor. A trickle charger (222) coupled to the power supply (242) and to the energy storage device (204), is configured to safely charge the energy storage device (204) in an event the energy storage device (204) has less than a predefined charge.

An over voltage switch (210) coupled to the power supply (242) and the energy storage device (204), is configured to safely charge the energy storage device (204) in an event a user increases a main power rail voltage (246) by exercising the actuator (110). The motor (106) may be used instead of a shunt (218) to discharge the energy storage device when the motor is not in use. The motor may burn off excess energy by passing DC or the equivalent of DC through PWM control. Passing DC through the motor may not allow the motor to move. This may allow for either a smaller wattage shunt or complete remove with the proper management of the exercise, that is requiring a rest period after excessive energy generation. In one embodiment, a charge dump includes an AC inverter, shunt, DC passing through motor, and 12V/USB charger.

A charge dump (216) coupled to the over voltage switch (210) is configured to safely dump charge in an event a charge is too much for the energy storage device (204). In one embodiment, the charge dump (216) includes a consumer charging station for charging consumer devices. In one embodiment, the charge dump (216) includes an AC inverter for feedback into an AC household system. For example, it may power household devices once the house electrical system is isolated from utility power from the exercise machine, provided the system has an DC to AC inverter. The exercise machine may also operate at reduced load such as 50 lbs per arm in this mode.

An under voltage switch (206) coupled to the power supply and the energy storage device, is configured to safely discharge the energy storage device (204) in an event a user decreases a main power rail voltage (246) by exercising the actuator (110). The main power rail (246) associated with the power supply (242) is set between 47.5 Volts and 48.5 Volts. In one embodiment, the power supply (242) can provide up to 200 lb of resistance force for the actuator (110).

The electrical storage device (204) has sufficient capacity and discharge current such that the electrical storage device (204) and power supply (242) together can provide up to 400 lb of resistance force for the actuator (110). In one embodiment, the electrical storage device (204) is rated for more than 32 Amperes of peak discharge current. In one embodiment, the electrical storage device (204) is rated for more than 6 Amperes of peak discharge current.

Although the foregoing embodiments have been described in some detail for purposes of clarity of understanding, the invention is not limited to the details provided. There

What is claimed is:

1. An exercise machine comprising:
   a motor;
   an actuator coupled to the motor, wherein the actuator establishes resistance for a user in an exercise;
   a torque controller coupled to a power supply and to the motor; and
   an energy storage device coupled to the torque controller, wherein an amount of torque generated by the motor is increased at least in part by combining power from the energy storage device with power from the power supply.

2. The exercise machine of claim 1, wherein the power from the energy storage device is combined with the power from the power supply in response to a request for increased torque.

3. The exercise machine of claim 1 wherein the amount of torque generated by the motor is increased at least in part by discharging the energy storage device to the motor.

4. The exercise machine of claim 1, wherein the actuator is coupled via a cable to the motor.

5. The exercise machine of claim 1, wherein the power supply is coupled to a standard household AC power circuit.

6. The exercise machine of claim 5, wherein the standard household AC power circuit comprises any circuit with power less than 2000 Watts.

7. The exercise machine of claim 5, wherein the standard household AC power circuit comprises any US circuit with amperage between 12 Amperes and 16 Amperes.

8. The exercise machine of claim 5, wherein the standard household AC power circuit comprises any European/Chinese circuit with amperage between 8 Amperes and 12 Amperes.

9. The exercise machine of claim 1, wherein the energy storage device comprises at least one of: a sealed lead-acid battery, a deep cycle battery, a marine battery, a lithium-ion battery, a lithium iron phosphate battery, a capacitor, or a supercapacitor.

10. The exercise machine of claim 1, further comprising a trickle charger coupled to the power supply and to the energy storage device, configured to safely charge the energy storage device in response to the energy storage device having less than a predefined charge.

11. The exercise machine of claim 1, further comprising an over voltage switch coupled to the power supply and the energy storage device, configured to safely charge the energy storage device in response to the user increasing a main power rail voltage by exercising the actuator.

12. The exercise machine of claim 11, further comprising a charge dump coupled to the over voltage switch configured to safely dump charge in response to a charge being too much for the energy storage device.

13. The exercise machine of claim 12, wherein the charge dump includes a consumer charging station for charging consumer devices.

14. The exercise machine of claim 12, wherein the charge dump includes using the motor in DC mode to discharge the energy storage device.

15. The exercise machine of claim 12, wherein the charge dump includes an AC inverter for feedback into an AC household system.

16. The exercise machine of claim 1, further comprising an under voltage switch coupled to the power supply and the energy storage device, configured to safely discharge the energy storage device in response to the user decreasing a main power rail voltage by exercising the actuator.

17. The exercise machine of claim 1, wherein a main power rail associated with the power supply is set between 23.5 Volts and 120.5 Volts.

18. The exercise machine of claim 1, wherein the power supply is rated below 1800 watts.

19. The exercise machine of claim 1, further comprising a second actuator, a second motor, and second torque controller, wherein the second motor is coupled to the second actuator and the second torque controller, and the second torque controller is coupled to the power supply.

20. The exercise machine of claim 1, wherein the power supply can provide up to 200 lb of resistance force for the actuator at a maximum speed of 90 inches per second.

21. The exercise machine of claim 1, wherein the energy storage device has sufficient capacity and discharge current such that the energy storage device and the power supply together can provide up to 400 lb of resistance force for the actuator at a maximum speed of 180 inches per second.

22. The exercise machine of claim 21, wherein the energy storage device is rated for between 6 Amperes and 60 Amperes of peak discharge current.

23. The exercise machine of claim 21, wherein the energy storage device is rated to boost torque by more than 20%.

24. A method, comprising:
increasing an amount of torque generated by a motor at least in part by combining power from an energy storage device with power from a power supply, wherein:
the energy storage device is coupled to a torque controller;
the torque controller is coupled to the power supply and to the motor; and
an actuator is coupled to the motor, wherein the actuator establishes resistance for a user in an exercise.

* * * * *